J. MILLER.
BILL FILE.
APPLICATION FILED JULY 29, 1908.
908,023.
Patented Dec. 29, 1908.
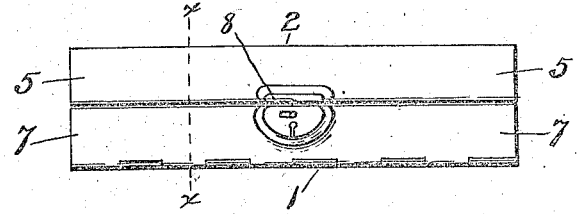
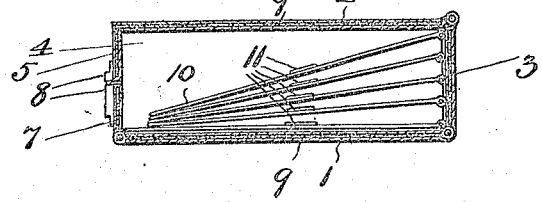
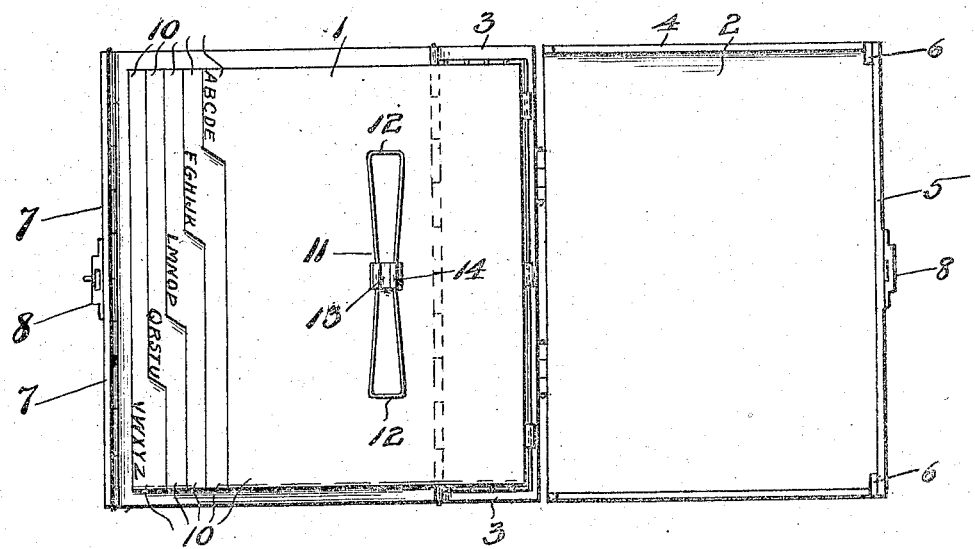
WITNESSES
INVENTOR
Joseph Miller
by his Attorney

UNITED STATES PATENT OFFICE.

JOSEPH MILLER, OF MARION, OHIO.

BILL-FILE.

No. 908,023.    Specification of Letters Patent.    Patented Dec. 29, 1908.

Application filed July 29, 1908. Serial No. 445,896.

*To all whom it may concern:*

Be it known that I, JOSEPH MILLER, a citizen of the United States, residing at Marion, in the county of Marion and State of Ohio, have invented certain new and useful Improvements in Bill-Files, of which the following is a specification.

My invention relates to devices for filing bills and has for its object the provision of a foldable box made preferably of metal, lined with a heat resisting substance such as asbestos, and having indexed leaves therein provided with clips to hold the bills.

The construction and operation of my improved bill file will be described in detail hereinafter and illustrated in the accompanying drawings in which—

Figure 1 is a view of my improved bill file with the box closed, Fig. 2 a cross section on the line $x$—$x$ of Fig. 1, and Fig. 3, a top plan view of the device open.

In the drawings similar reference characters indicate corresponding parts in the several views.

The box consists of the bottom 1 and top 2 hinged to side 3, while the ends 4 are rigidly secured to the top 2. The remaining side is divided, the upper portion 5 being rigidly secured to the top 1 and to flanges 6 extending inwardly from the ends 4, while the lower portion 7 is hinged to the edge of the bottom opposite to the side 3. The upper and lower portions 5 and 7 are provided with a lock 8 so that the box may be secured in a closed condition when not in use.

In the preferred form of my device the top and bottom, sides and ends are made in two thicknesses of sheet metal spaced apart and the space formed thereby filled with asbestos 9 or other heat resisting substance to make the box fire-proof, though the box may be made of any other material than metal and without the heat resisting substance 9, if desired, without altering the spirit of my invention which consists essentially of the box constructed of hinged sections and with the leaves arranged as hereinafter described.

The leaves 10 are hinged to side 3, spaced apart as shown and have one of their edges indexed as shown for ready reference. 11 indicates clips secured to the two sides of the leaves 10, each of said clips being formed of a single strand of wire bent to form two loops 12 secured to each side of the leaves 10 by means of a strip of metal 13 passed through slots 14 in the leaves and secured to the leaves by means of solder or other securing device.

It will be apparent that my invention is particularly adapted to use by merchants and when in use the memorandums of sales are secured to the leaves by inserting them under the clips 11 so that they can be readily found and the necessity of keeping a book account with each customer may be dispensed with, or the device may be used for storing receipts, important papers, etc., the indexing of the leaves insuring ready reference while the fire proof nature of the box will preserve the contents from destruction. Owing to the compactness of the device it may be stored in a safe to further protect the contents from fire and to keep it from being stolen.

It will be further understood that by the construction of the box of hinged sections the leaves are in a substantially flat position when the device is open on the desk or counter.

Having thus described my invention what I claim is—

1. In a bill file, a box having its top and bottom hinged to one of its sides, indexed leaves hinged to the same side, the ends of the box rigidly secured to the top, and the remaining side formed in two portions, one portion rigidly secured to the top, and the remaining portion hinged to the bottom.

2. A bill file consisting of a box having its top and bottom hinged to one of its sides, indexed leaves hinged to the same side and spaced apart thereon, clips formed of single strands of wire secured on each side of said leaves, the ends of the box rigidly secured to the top, the remaining side formed in two portions, one portion rigidly secured to the top, and the other portion hinged to the bottom, and a lock to secure the two portions of the last mentioned side together.

In testimony whereof I hereto affix my signature in the presence of two witnesses.

JOSEPH MILLER.

Witnesses:
 JOHN H. CLARK,
 JOHN R. SEVERNS.